United States Patent
Stewart et al.

(10) Patent No.: US 9,195,276 B2
(45) Date of Patent: Nov. 24, 2015

(54) OPTICAL USER INPUT DEVICES

(75) Inventors: Aaron Michael Stewart, Raleigh, NC (US); Harriss Christopher Neil Ganey, Cary, NC (US); Yang Jinping, Beijing (CN); Jay Wesley Johnson, Raleigh, NC (US); Julie Anne Morris, Raleigh, NC (US); James Stephen Rutledge, Durham, NC (US); Bradley Park Strazisar, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 254 days.

(21) Appl. No.: 12/859,428

(22) Filed: Aug. 19, 2010

(65) Prior Publication Data
US 2012/0044146 A1  Feb. 23, 2012

(51) Int. Cl.
| | |
|---|---|
| *G06F 1/16* | (2006.01) |
| *G06F 3/02* | (2006.01) |
| *G06F 3/042* | (2006.01) |
| *G06F 3/0481* | (2013.01) |
| *G06F 3/0484* | (2013.01) |
| *G06F 3/0488* | (2013.01) |

(52) U.S. Cl.
CPC .............. *G06F 1/169* (2013.01); *G06F 3/0213* (2013.01); *G06F 3/042* (2013.01); *G06F 3/0481* (2013.01); *G06F 3/04845* (2013.01); *G06F 3/04883* (2013.01); *G06F 2203/04806* (2013.01)

(58) Field of Classification Search
CPC ..... G06F 1/169; G06F 3/0213; G06F 3/0205; G06F 3/0485; G06F 2203/04806; G06F 2203/04808; G06F 3/04845; G06F 3/048; G06F 3/0481
USPC .......................................................... 345/168
See application file for complete search history.

(56) References Cited

U.S. PATENT DOCUMENTS

| | | | |
|---|---|---|---|
| 5,812,171 A | 9/1998 | Kim | |
| 2002/0118164 A1* | 8/2002 | Buss | 345/156 |
| 2003/0117370 A1* | 6/2003 | Van Brocklin et al. | 345/156 |
| 2010/0026626 A1* | 2/2010 | Macfarlane | 345/160 |
| 2010/0277419 A1* | 11/2010 | Ganey et al. | 345/173 |
| 2011/0157023 A1* | 6/2011 | Hsu et al. | 345/173 |
| 2012/0038674 A1* | 2/2012 | Stergiou et al. | 345/650 |

FOREIGN PATENT DOCUMENTS

CN        1149463 C      5/2004

* cited by examiner

*Primary Examiner* — Gerald Johnson
*Assistant Examiner* — Christopher Kohlman
(74) *Attorney, Agent, or Firm* — Ference & Associates LLC (57) ABSTRACT

Embodiments provisioning various electronic devices with optical user input devices having one or more optical sensors are described. Embodiments broadly contemplate expanding the functionality of current user input devices through use of a variety of optical sensors in a variety of configurations, as described further herein.

19 Claims, 6 Drawing Sheets

OPTICAL USER INPUT DEVICES

BACKGROUND

The subject matter presented herein generally relates to optical user input devices for electronic devices.

Current input technologies to control the cursor (mouse pointer) on an electronic device such as a laptop include various pointing devices, for example a touch device pointing device and a Trackpoint® pointing device. Certain electronic devices, for example smart phones and personal digital assistants, include an optical sensor. An optical sensor can be viewed as a small touch device (for example, somewhat similar to a touch pad), and is already in use to control the cursor (mouse pointer) on handheld devices, such as a Blackberry® handheld device. TRACKPOINT is a registered trademark of LENOVO (SINGAPORE) PTE. LTD. in the United States and other countries. BLACKBERRY is a registered trademark of Research In Motion Limited Corp. in the United States and other countries.

BRIEF SUMMARY

In summary, one aspect provides an apparatus comprising: one or more processors; a display device operatively connected to the one or more processors; and a plurality of optical sensors configured to accept user input, wherein an input on one optical sensor modifies a result of an input on another optical sensor; wherein, responsive to execution of computer readable program code accessible to the one or more processors, the one or more processors are configured to: receive inputs from the plurality of optical sensors; and modify an output for display responsive to the inputs from the plurality of optical sensors.

Another aspect provides a method comprising: receiving inputs from a plurality of optical sensors, wherein an input on one optical sensor modifies a result of an input on another optical sensor; and modifying an output for display on a display of an electronic device responsive to the inputs from the plurality of optical sensors.

A further aspect provides a computer program product comprising: a computer readable storage medium having computer readable program code embodied therewith, the computer readable program code comprising: computer readable program code configured to receive inputs from a plurality of optical sensors, wherein an input on one optical sensor modifies a result of an input on another optical sensor; and computer readable program code configured to modify an output for display on a display of an electronic device responsive to the inputs from the plurality of optical sensors.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described embodiments. Thus, the following more detailed description of the embodiments, as represented in the figures, is not intended to limit the scope of the claims, but is merely representative of those embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

Embodiments provide systems, methods, apparatuses and computer program products configured to provision various electronic devices with optical user input devices having one or more optical sensors. Embodiments broadly contemplate expanding the functionality of current user input devices through use of a variety of optical sensors in a variety of configurations, as described further herein.

Certain embodiments, as further described herein, employ a plurality of optical sensors that, given the input at any time on each sensor, allow a computing device to determine the correct response/output. For example, if the device ascertains a touch of sensor 2, then action 1 is the response. However, if there is a touch on sensor 1 and a touch on sensor 2, at the same time, then action 2 is performed instead of action 1, and so on. Thus, embodiments employ a sense of chronology to the input across sensors. The chronology defines what input on each sensor will do. Additionally, there is knowledge of direction on each sensor that affects the resulting output for any subsequent touch on another sensor. For example, touch and hold (a "pin") on sensor 1, versus for example moving down on sensor 1, will change the result of touch on sensor 2. These and other non-limiting example functions are further described herein.

The description now turns to the figures. The example embodiments will be best understood by reference to the figures, and the scope of the invention will be pointed out in the appended claims.

Figure 1:
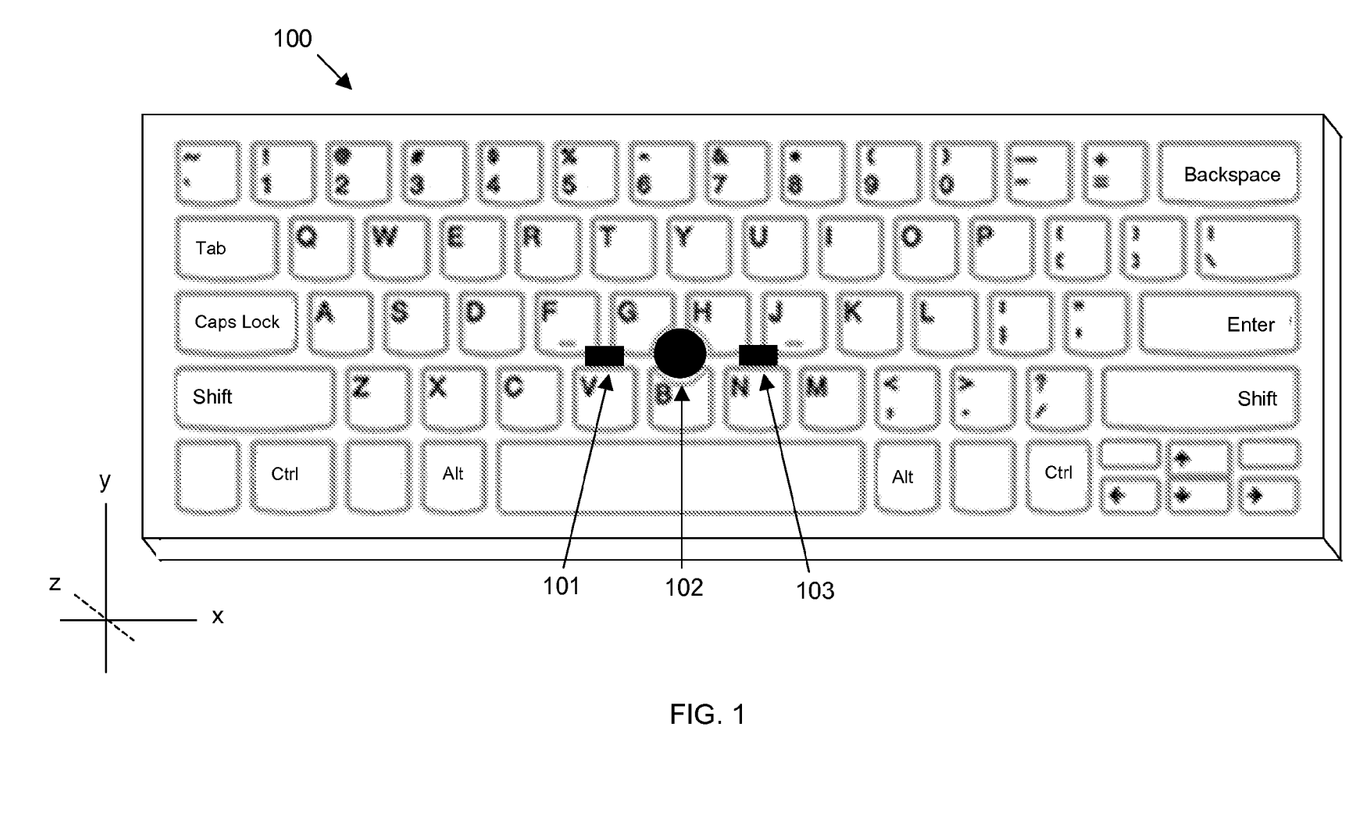
FIG. 1 illustrates a user-input device having three optical sensors.

Referring to FIG. 1, an example user input device is illustrated having three optical sensors 101, 102, 103. The optical sensors 101, 102, 103 can be any of a variety of types, such as LED or laser, and may be obtained from a variety of sources, such as Partron or STmicroelectronics. In this example embodiment, the three optical sensors 101, 102, 103 are employed and situated about a keyboard 100. It should be noted that while the example embodiments described herein and illustrated as having optical sensors being disposed about a keyboard, this is just one example of many different possible configurations. For example, the optical sensors may be disposed within their own stand-alone area as a separate user input device. The keyboard 100 can be operatively connected to an electronic device, such as for example a desktop computer, or integrated into a device, such as with a laptop computer or handheld device, such as a smart phone or personal digital assistant.

In this case, the area on the keyboard 100 where a Trackpoint® pointing device is normally located, that is, between the "G", "H" and "B" keys, is replaced by one optical sensor 102 which is considered the primary sensor. The primary sensor 102 is clickable in the "Z" direction (via pressing down on the primary sensor 102, as with a mechanical button such as a touch device button). Two "modifier" optical sensors 101, 103 are placed to the left and right of the primary sensor 102. The modifier sensors 101, 103 are also clickable in the Z direction. These modifier sensors 101, 103 are placed along (for example, just below) the home row of keys ("A", "S", "D", et cetera) for easy access to the touch typist, but this positioning, as well as their distance from the primary sensor 102, is configurable to accommodate a variety of keyboard layouts for a variety of different devices, and the like. Size and shape of each sensor can be configured as appropriate for the location within the keyboard, with placement of a larger sensor between the "G", "H" and "B" keys.

The optical sensors receive input(s) from the user, either through clicks, tapping (touching/covering), or via gesturing (movement, for example, movement of a user's finger(s) relative to the sensors). The input(s) is/are provided via an appropriate input interface for the electronic device, for example similar to that of touch device input through a PS 2 interface or USB, as is known. The inputs can be processed by an appropriate processor, for example a processor included in a sub-system or a general-purpose processor of the device.

Some examples of basic functions of the three sensors 101, 102, 103 providing the optical user input device are as follows. For pointer (cursor) movement action (moving the cursor around the screen), the primary sensor 102 performs much like a small touch device, that is, by sweeping the finger across the primary sensor 102.

Left and right clicks are mapped to a z-click or tap (down press) of one of the modifier sensors 101, 103. For a right-handed user, a z-click or tap of the sensor 103 to the right of the primary sensor 102 can indicate a left-click (as of a traditional mouse or touch device button), and a z-click or tap of the sensor 101 to the left of the primary sensor 102 can indicate a right-click. For a left-handed user, a z-click or tap of the sensor 101 to the left of the primary sensor 102 can indicate a left-click and a z-click or tap of the sensor 103 to the right of the primary sensor 102 can indicate a right-click. A preferred configuration, different from that described above, can of course be set by the end-user. This may be accomplished several ways, such as accessing a control panel of the device operating system and updating default settings.

To perform area selection, such as highlighting an area of a document for a copy action, a user can z-click and hold (click down and hold) either of the two modifier sensors 101, 103. Then, a user can use the primary sensor 102 as a small touch device, sweeping a finger over the sensor 102 until the desired area is selected. Once the area is selected, release of the z-click of the modifier sensor 101 or 103 is performed to complete the area selection action. The user can click and hold either of the modifier sensors 101, 103 to get area selection, regardless of left-handed or right-handed orientation.

Some example gestures that can be performed in accordance with the embodiment illustrated in FIG. 1 are now described. For example, to perform a scroll action, as through a web page, a user can sweep finger(s) across both modifier sensors 101, 103 at the same time, in the same direction. For example, a user sweeping fingers up both modifier sensors 101, 103 can indicate scroll up. Both vertical and horizontal scrolling are simultaneously supported.

To perform a zoom action on a document (in or out), a user can sweep fingers across both modifier sensors 101, 103 at the same time in opposite directions. Motioning with both fingers away from the primary sensor 102 can equal zoom in. Motioning towards the primary sensor 102 can equal zoom out. These actions emulate pinch out and pinch in, as on a touch screen, which many users are becoming accustomed to.

To perform a rotate action on a document, a user can perform pin rotation by touching one modifier sensor, for example sensor 101, while at the same time, sweeping a finger up or down along the other modifier sensor, for example, 103, to emulate clockwise or counterclockwise rotation. To perform a flick action on a document, such as a virtual paging action, a user may touch one modifier sensor, for example, 101, and hold, while at the same time, sweeping a finger left or right along other sensor, for example, 103, to emulate left or right flick. Table 1 includes a summary of some example functions for a three-sensor configuration, for example as illustrated in FIG. 1.

TABLE 1

Three sensor configuration example functions

| Action | Left Modifier Sensor | Primary Sensor | Right Modifier Sensor |
|---|---|---|---|
| Move Cursor | Sweep finger in desired direction | Sweep finger in desired direction | Sweep finer in desired direction |
| Left Click | z-click or tap | | z-click or tap |
| Right Click | z-click or tap | | z-click or tap |
| Area Select | z-click and hold/release | Sweep finger to highlight desired area | z-click and hold/release |
| Scroll | Sweep finger in scroll direction | | Sweep finger in scroll direction |
| Zoom in | Sweep finger away from keyboard center | | Sweep finger away from keyboard center |
| Zoom out | Sweep finger towards keyboard center | | Sweep finger towards keyboard center |
| Rotate Clockwise | Tap and hold | Sweep finger in direction of desired rotation | Tap and hold |
| Rotate Counter-clockwise | Tap and hold | Sweep finger in direction of desired rotation | Tap and hold |
| Flick | Tap and hold | Flick finger in desired direction | Tap and hold |

Other embodiments commensurate with that illustrated in FIG. 1 can include using two simple (mechanical) buttons instead of the optical sensors for the modifier sensors 101, 103. This could be accomplished for example by assigning the click and or touch actions described herein to the mechanical buttons (as click actions), and assigning the movement actions to the primary sensor 102. Moreover, various functions defined above may be modified and/or various functions not defined above could be enabled. For example, a z-click of the primary sensor 102 can create an on-screen pop-up allowing the user to toggle through other various functions that are not defined above and/or modify various functions defined above, as those defined above are simply illustrative examples.

Figure 2:
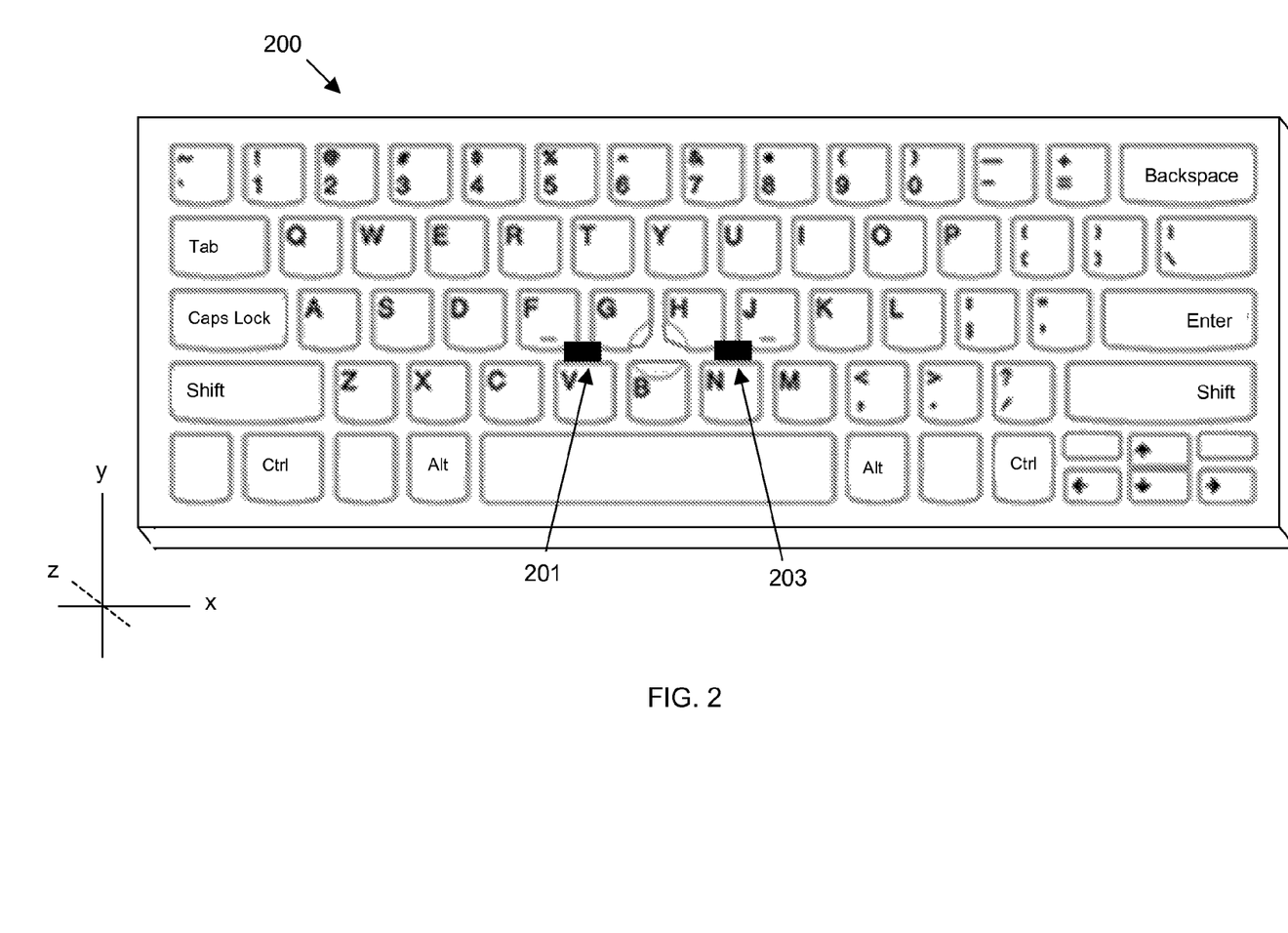
FIG. 2 illustrates a user-input device having two optical sensors in a horizontal configuration.

Referring to FIG. 2, in another embodiment, two optical sensors are employed in a horizontal orientation. In this case, the primary sensor 102 is not included. Two optical sensors 201, 203, each clickable in the z-direction (again, via pressing down), are placed on the keyboard 200. Exact placement of the two sensors is configurable, although an example placement for each is illustrated in FIG. 2. Possible orientations include but are not limited to the following.

The sensors 201, 203 can be placed along the home row of keys (on either side of the Trackpoint® pointing device area (that is, near the "F", "G", and "V" keys and likewise near the "H", "J", and "N" keys, or the "G", "B", and "V" keys and the "H", "B", and "N" keys)). Alternatively, the sensors 201, 203 can be aligned vertically between the "T", "G", and "B"/"Y", "H", and "N" key columns. As will be apparent throughout, orientation of the sensors can be selected such that a preference factor (for example, placement interfering the least with typing, placement indicated as most preferably affording user-preferred functions, and the like) is adhered to.

As the embodiment illustrated in FIG. 2 lacks the primary sensor 102, two example possibilities for determining a "primary" sensor in the two-sensor configuration are now described. For fixed assignment, if the user chooses right-handed orientation, then the right sensor 203 can be the primary sensor. If the user chooses left-handed orientation, then the left sensor 201 can be the primary sensor. The default option can be a right-handed orientation, which can of course be changed by the end user.

Alternatively, for auto-adjusting assignment of a primary sensor in the two-sensor configuration, the first sensor to be touched (for example, in a sweeping motion) can be the primary sensor. The sensor so selected retains primary status until there is an indicator of reassignment, such as a sweeping motion along the other sensor, modification via a control panel setting, or the like. If both sensors detect a sweeping motion simultaneously (or nearly so), such as during a gesture, then whichever sensor had primary status before the gesture can keep the primary status.

Some examples of basic functions of the horizontal two-sensor configuration are now described. For pointer movement, either sensor 201, 203 can be used like a small touch device by sweeping the finger across the sensor. For left click, a user can lightly tap/touch (not a z-click) on either sensor 201, 203. For right click, a user can z-click either sensor 201, 203. For area selection, a user can z-click and hold on one sensor, for example, sensor 201, then sweep a finger across the other sensor, for example, sensor 203, to move the cursor and select the desired area. A release of the z-click can indicate a completion of the area selection action.

Some example gesture functions are now described for the horizontal two-sensor configuration. To scroll, a user can simultaneously sweep his or her fingers across both sensors 201, 203 in the same direction, such as up, down or in either horizontal direction (or a combination thereof). These actions result in the document, such as a web page, scrolling in the screen as indicated by the inputs. Both vertical and horizontal scrolling are simultaneously supported.

Figure 3:
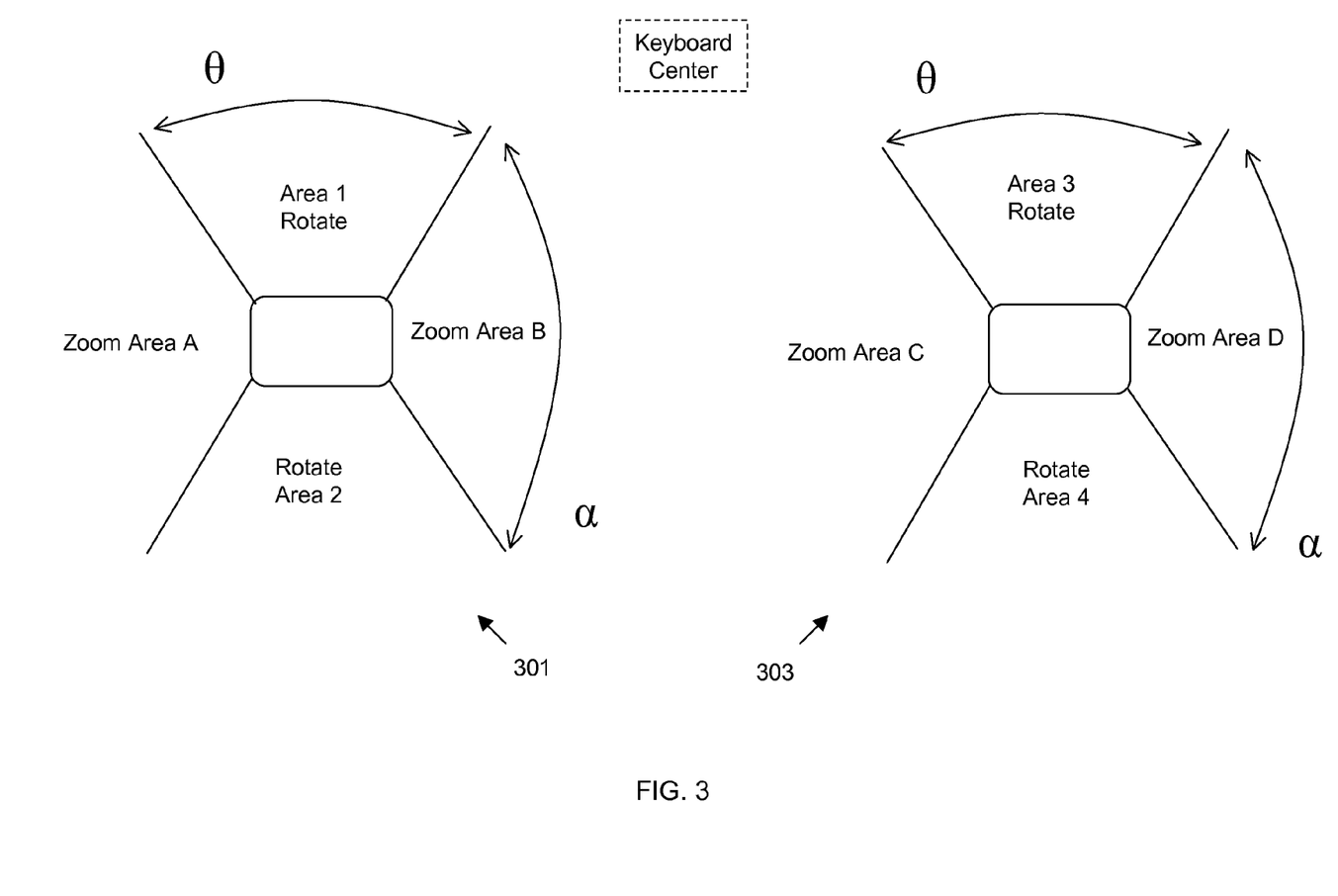
FIG. 3 illustrates examples of basic functions of a user-input device having two optical sensors.

Referring to FIG. 3, rotation and zooming for the horizontal two-sensor configuration are illustrated. To zoom, a user can simultaneously sweep his or her fingers across both sensors 201, 203 in opposite directions, within a pre-defined horizontal area ("zoom area"). FIG. 3 illustrates examples of the defined "zoom" area. Motion away from the keyboard 200 center can equal zoom in. Motion towards the keyboard 200 center can equal zoom out, again emulating a pinch out and pinch in, such as with a touch screen. To rotate, a user can tap and hold one sensor, for example sensor 301, while sweeping a finger up or down in the pre-defined vertical (rotate) areas, as illustrated in FIG. 3, to rotate a document clockwise or counterclockwise.

For example, a user moves his or her finger to the left into Zoom Area A on left sensor 301 and moves another finger to the right into Zoom Area D on the right sensor 303 to cause a zoom in. As another example, a user covers the left sensor 301 and moves another finger down into Rotate Area 4 on the right sensor 303 to cause a rotate. As an example, a default setting of $\theta=90$ degrees and $\alpha=90$ degrees where $\theta$, $\alpha$ go from 45 degrees to 135 degrees, respectively, defines zoom and rotate areas about the sensors. Other settings are possible. A simultaneous z-click on both sensors 301, 303 creates an onscreen pop-up menu that toggles through other advanced options, such as flicks. Table 2 includes a summary of some example functions for a horizontal two-sensor configuration, for example as illustrated in FIG. 2-3.

TABLE 2

Two sensor horizontal configuration example functions

| Action | Left Sensor | Right Sensor |
|---|---|---|
| Move Cursor | Sweep finger in desired direction | Sweep finger in desired direction |
| Left Click | Tap | Tap |
| Right Click | z-click | z-click |
| Area Select | z-click and hold/highlight with right sensor/release | z-click and hold/highlight with left sensor/release |
| Scroll | Sweep finger in scroll direction | Sweep finger in scroll direction |
| Zoom in | Sweep fingers away from keyboard center | Sweep fingers away from keyboard center |
| Zoom out | Sweep fingers towards keyboard center | Sweep fingers towards keyboard center |
| Rotate Clockwise | Tap and hold/sweep finger in desired direction of rotation with right sensor | Tap and hold/sweep finger in desired direction of rotation with left sensor |
| Rotate Counterclockwise | Tap and hold/sweep finger in desired direction of rotation with right sensor | Tap and hold/sweep finger in desired direction of rotation with left sensor |
| Flick | Tap and hold/flick with right sensor | Tap and hold/flick with left sensor |

Figure 4:
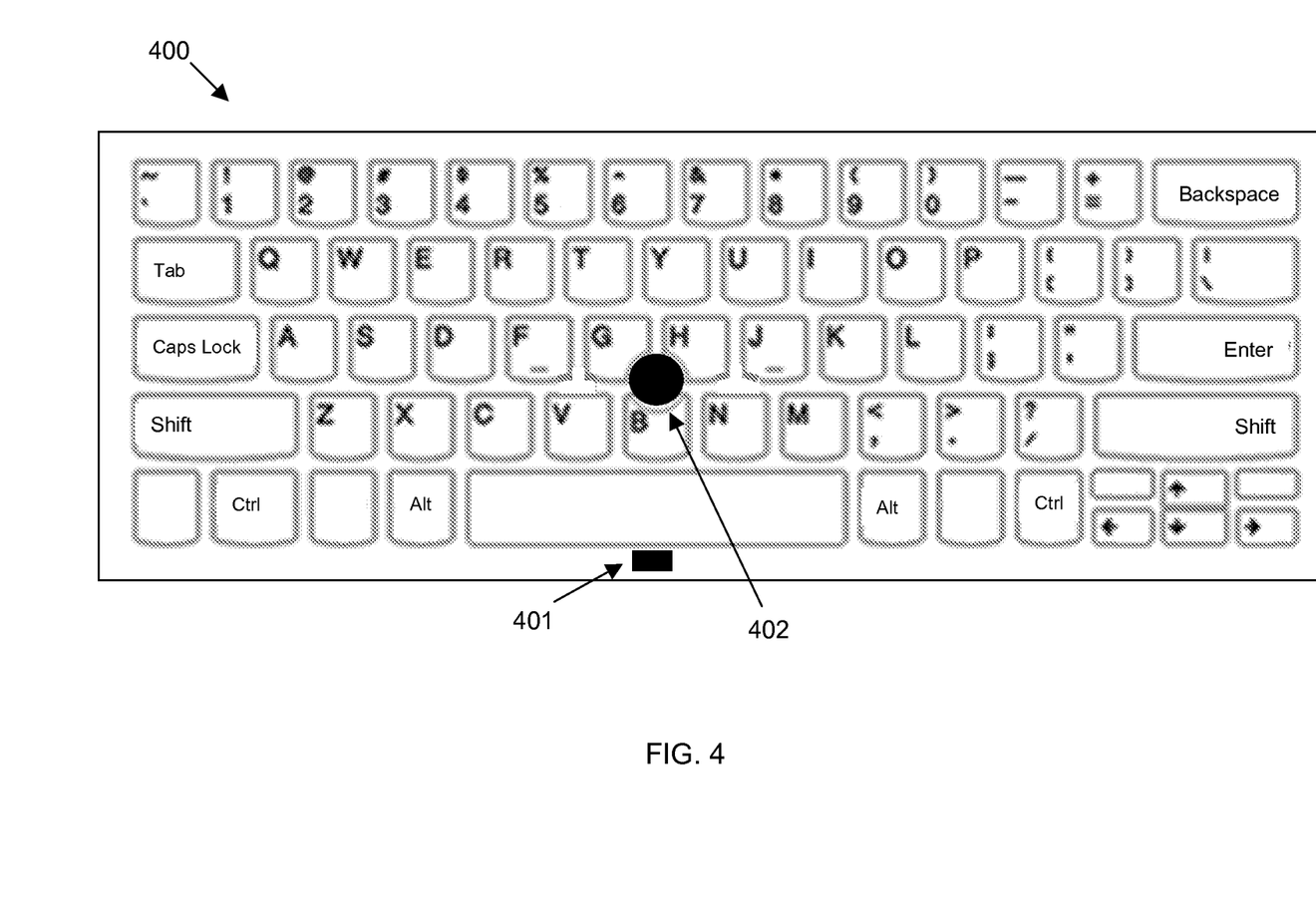
FIG. 4 illustrates a user-input device having two optical sensors in a vertical configuration.

FIG. 4 illustrates another embodiment having two optical sensors 402, 401 positioned about the keyboard 400 in a vertical orientation. In this example case, an optical sensor 402 occupies an area in which a Trackpoint® pointing device would normally be found, as in FIG. 1. This sensor 402 can be clicked in the z direction. Another optical sensor 401 is placed lower than sensor 402, such as below the keyboard space bar.

Because there are two sensors included, there are described two examples of determining a "primary" sensor. For fixed assignment, if the user is familiar with the Trackpoint® pointing device functions, he or she can chose the sensor 402 as primary. If the user is more familiar with touch device functions, he or she can chose the bottom sensor 401 as primary. The default option can be to set the sensor 401 as primary.

For auto-adjusting assignment, the first sensor to be touched in a sweeping motion can be the primary sensor. The sensor so selected retains primary status until there is a sweeping motion along the other sensor. If both sensors detect a sweeping motion simultaneously (or nearly so), such as during a gesture, then whichever sensor had primary status before the gesture can keep its primary status.

Some examples of basic functions for the vertical two-sensor configuration are now described. For pointer movement, the primary sensor can be used like a touch device, that is, with a sweeping motion over the sensor. The functioning of the primary sensor, for example sensor 402, can for example be the same as that explained above for pointer movement with a primary sensor. To left click, the user can tap on either sensor 401, 402. For right click the user can z-click on either sensor 401, 402.

For area selection, the user can z-click and hold one of the sensors 401, 402. Then, the user can sweep a finger across the other sensor until the desired area is selected. A release of the z-click can again indicate completion of the area selection action.

Some examples of gestures for the vertical two-sensor configuration are now described. To scroll, a user can simultaneously sweep his or her fingers along both sensors 401, 402 in the same direction. Both vertical and horizontal scrolling are again simultaneously supported. To zoom, a user can simultaneously sweep his or her fingers along both sensors 401, 402 in opposite directions, within a pre-defined horizontal, cone-shaped area, as illustrated in FIG. 5.

Figure 5:
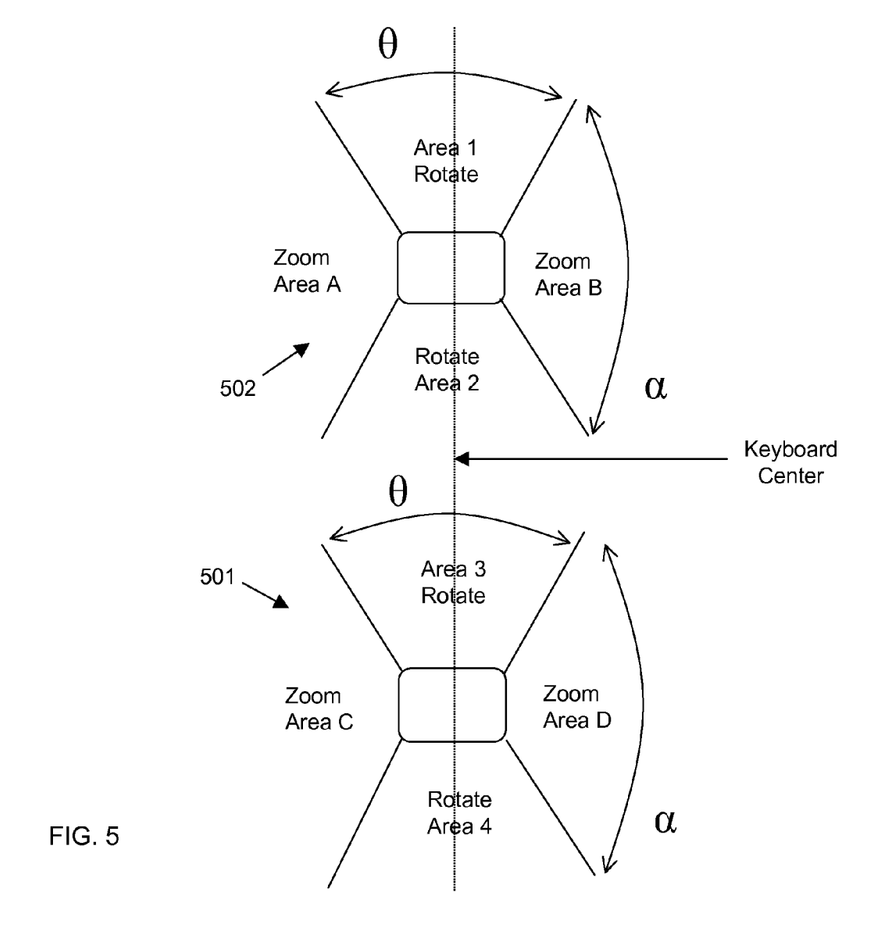
FIG. 5 illustrates examples of basic functions of a user-input device having two optical sensors.

In FIG. 5, the predefined "zoom" and "rotate" areas can be used similar to those in the horizontal optical sensor orientation, as described in connection with FIG. 3, with the orientations appropriately modified for vertical alignment of the optical sensors 501, 502. Motion away from the center of the keyboard can again equal zoom in. Motion towards the center of the keyboard can again equal zoom out. Again, this is simply one example configuration, such as for emulating pinch out and pinch in actions of a touch screen.

To rotate, a user can tap and hold (keep covered) one sensor, for example, sensor 502, while simultaneously sweeping a finger along the other sensor, for example, sensor 501, within a pre-defined vertical, cone-shaped area. A simultaneous z-click on both sensors 501, 502 creates an onscreen pop-up menu that toggles through other advanced options, such as flicks. Table 3 includes a summary of some example functions for a vertical two-sensor configuration, for example as illustrated in FIG. 4-5.

TABLE 3

Two sensor vertical configuration example functions

| Action | Top Sensor | Bottom Sensor |
|---|---|---|
| Move Cursor | Sweep finger in desired direction | Sweep finger in desired direction |
| Left Click | Tap | Tap |
| Right Click | z-click | z-click |
| Area Select | z-click and hold/ highlight with bottom sensor/release | z-click and hold/ highlight with top sensor/release |
| Scroll | Sweep finger in scroll direction | Sweep finger in scroll direction |
| Zoom in | Sweep finger away from keyboard center | Sweep finger away from keyboard center |

TABLE 3-continued

Two sensor vertical configuration example functions

| Action | Top Sensor | Bottom Sensor |
|---|---|---|
| Zoom out | Sweep fingers towards keyboard center | Sweep fingers towards keyboard center |
| Rotate Clockwise | Tap and hold/sweep finger in desired direction of rotation with bottom sensor | Tap and hold/sweep finger in desired direction of rotation with top sensor |
| Rotate Counterclockwise | Tap and hold/sweep finger in desired direction of rotation with bottom sensor | Tap and hold/sweep finger in desired direction of rotation with top sensor |
| Flick | Tap and hold/flick with bottom sensor | Tap and hold/flick with top sensor |

It will be understood by those having ordinary skill in the art that the embodiments can be implemented with electronic devices having appropriately configured circuitry, such as a desktop or laptop computer system, handheld devices, and the like. A non-limiting example of a computer system is described below.

The term "circuit" or "circuitry" as used herein includes all levels of available integration, for example, from discrete logic circuits to the highest level of circuit integration such as VLSI, and includes programmable logic components programmed to perform the functions of an embodiment as well as general-purpose or special-purpose processors programmed with instructions to perform those functions.

Figure 6:
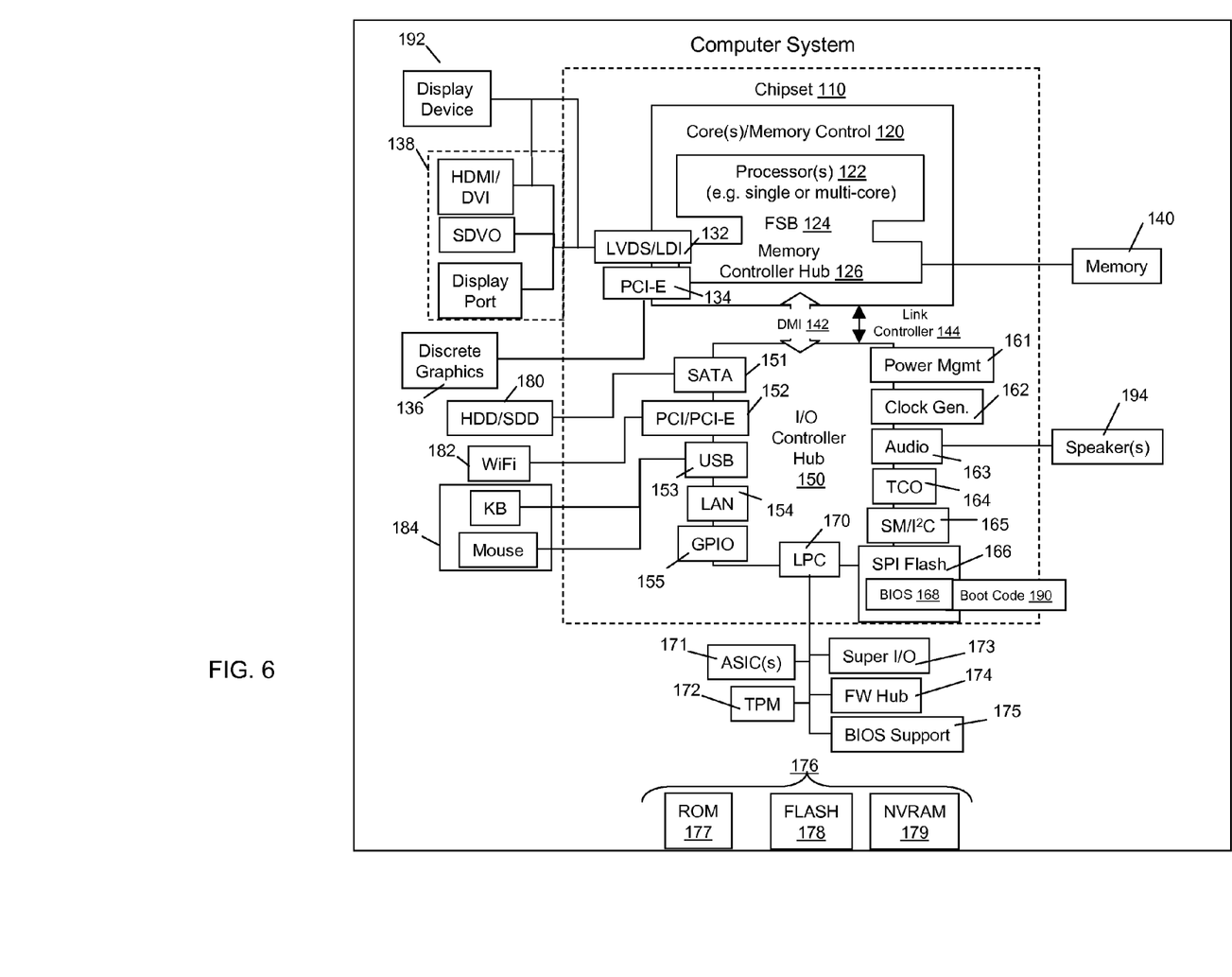
FIG. 6 illustrates a computer system.

While various other circuits or circuitry may be utilized, FIG. 6 depicts a block diagram of one example of a computer system and circuitry. The system may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a handheld device, or other machine may include other features or only some of the features of the system illustrated in FIG. 6.

The computer system of FIG. 6 includes a so-called chipset 110 (a group of integrated circuits, or chips, that work together, chipsets) with an architecture that may vary depending on manufacturer (for example, INTEL®, AMD®, etc.). The architecture of the chipset 110 includes a core and memory control group 120 and an I/O controller hub 150 that exchange information (for example, data, signals, commands, et cetera) via a direct management interface (DMI) 142 or a link controller 144. In FIG. 6, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 6, the memory controller hub 126 interfaces with memory 140 (for example, to provide support for a type of RAM that may be referred to as "system memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 6, the I/O hub controller 150 includes a SATA interface 151 (for example, for HDDs, SDDs, et cetera), a PCI-E interface 152 (for example, for wireless connections 182), a USB interface 153 (for example, for input devices 184 such as keyboard, optical sensors, mice, cameras, phones, storage, et cetera.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 6.

Furthermore, embodiments may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations may be written in any combination of one or more programming languages, including an object oriented programming language and conventional procedural programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described herein with reference to figures, including illustrations and descriptions of functions that can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified.

These computer program instructions may also be stored in a computer readable medium that can direct a computer, other programmable data processing apparatus, or other devices to function in a particular manner, such that the instructions stored in the computer readable medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein with reference to the accompanying drawings, it is to be understood that the embodiments are not limited to those precise descriptions, and that various other changes and modifications may be affected therein by one skilled in the art without departing from the scope or spirit of the disclosure.

What is claimed is:

1. An apparatus comprising:
   one or more processors;
   a display device operatively coupled to the one or more processors; and
   a plurality of optical sensors that accept user input, wherein an input on one optical sensor modifies a result of an input on another optical sensor, wherein one of the plurality of optical sensors is a primary optical sensor designated prior to receiving user input thereto, and further wherein the other optical sensors are modifier optical sensors;
   wherein at least one of the primary optical sensor and the modifier optical sensors provides predefined zoom and rotation areas referenced to another sensor;
   wherein, responsive to execution of computer readable program code accessible to the one or more processors, the one or more processors:
   receive inputs from the plurality of optical sensors;
   modify an output for display responsive to the inputs from the plurality of optical sensors;
   in response to receiving an input at the primary optical sensor, provide a user interface for modifying one or more functions associated with one or more of the plurality of optical sensors; and
   modify the one or more functions in response to an input to the user interface.

2. The apparatus according to claim 1, wherein two or more of the plurality of optical sensors provide in combination inputs corresponding to one or more of a scroll action, a rotate action, and a zoom action.

3. The apparatus according to claim 1, wherein the plurality of optical sensors accept gesture input and one or more of click input and tap input.

4. The apparatus according to claim 1, wherein the plurality of optical sensors comprise a first optical sensor, a second optical sensor, and a third optical sensor, and further wherein the first optical sensor, the second optical sensor and the third optical sensor are disposed about a keyboard of the apparatus in a horizontal configuration.

5. The apparatus according to claim 4, wherein the second optical sensor is a primary optical sensor, and further wherein the first optical sensor and the third optical sensor are modifier optical sensors.

6. The apparatus according to claim 1, wherein the plurality of optical sensors comprise a first optical sensor and a second optical sensor, and further wherein the first optical sensor and the second optical sensor are disposed about a keyboard of the apparatus in a horizontal configuration.

7. The apparatus according to claim 1, wherein the plurality of optical sensors comprise a first optical sensor and a second optical sensor, and further wherein the first optical sensor and the second optical sensor are disposed about a keyboard of the apparatus in a vertical configuration.

8. The apparatus according to claim 1, wherein one of the plurality of optical sensors is disposed in a central position of a keyboard of said apparatus.

9. A method comprising:
receiving inputs from a plurality of optical sensors, wherein an input on one optical sensor modifies a result of an input on another optical sensor, wherein one of the plurality of optical sensors is a primary optical sensor, and further wherein the other optical sensors are modifier optical sensors;
wherein at least one of the primary optical sensor and the modifier optical sensors provides predefined zoom and rotation areas referenced to another sensor;
modifying an output for display responsive to the inputs from the plurality of optical sensors;
in response to receiving an input at the primary optical sensor, providing a user interface for modifying one or more functions associated with one or more of the plurality of optical sensors; and
modifying the one or more functions in response to an input to the user interface.

10. The method according to claim 9, wherein two or more of the plurality of optical sensors provide in combination inputs corresponding to one or more of a scroll action, a rotate action, and a zoom action.

11. The method according to claim 9, wherein the plurality of optical sensors accept gesture input and one or more of click input and tap input.

12. The method according to claim 9, wherein the plurality of optical sensors comprise a first optical sensor, a second optical sensor, and a third optical sensor, and further wherein the first optical sensor, the second optical sensor and the third optical sensor are disposed about a keyboard of the electronic device in a horizontal configuration.

13. The method according to claim 12, further comprising setting one of the first optical sensor, the second optical sensor, and the third optical sensor as a primary optical sensor.

14. The method according to claim 9, wherein the plurality of optical sensors comprise a first optical sensor and a second optical sensor, and further wherein the first optical sensor and the second optical sensor are disposed about a keyboard of the electronic device in a horizontal configuration.

15. The method according to claim 14, further comprising, responsive to an input from one of the first optical sensor and the second optical sensor, selecting a primary sensor from the first optical sensor and the second optical sensor.

16. The method according to claim 9, wherein the plurality of optical sensors comprise a first optical sensor and a second optical sensor, and further wherein the first optical sensor and the second optical sensor are disposed about a keyboard of the electronic device in a vertical configuration.

17. The method according to claim 16, further comprising, responsive to an input from one of the first optical sensor and the second optical sensor, selecting a primary sensor from the first optical sensor and the second optical sensor.

18. A computer program product comprising:
a computer readable storage medium having computer readable program code embodied therewith, the computer readable program code comprising:
computer readable program code that receives inputs from a plurality of optical sensors, wherein an input on one optical sensor modifies a result of an input on another optical sensor, wherein one of the plurality of optical sensors is a primary optical sensor, and further wherein the other optical sensors are modifier optical sensors;
wherein at least one of the primary optical sensor and the modifier optical sensors provides predefined zoom and rotation areas referenced to another sensor; and
computer readable program code that:
modifies an output for display on a display of an electronic device responsive to the inputs from the plurality of optical sensors;
in response to receiving an input at the primary optical sensor, provides a user interface for modifying one or more functions associated with one or more of the plurality of optical sensors; and
modifies the one or more functions in response to an input to the user interface.

19. The apparatus according to claim 1, wherein at least one of the primary optical sensor and the modifier optical sensors provides predefined zoom and rotation areas referenced to at least one of the primary optical sensor and the modifier optical sensors.

* * * * *